Patented July 2, 1940

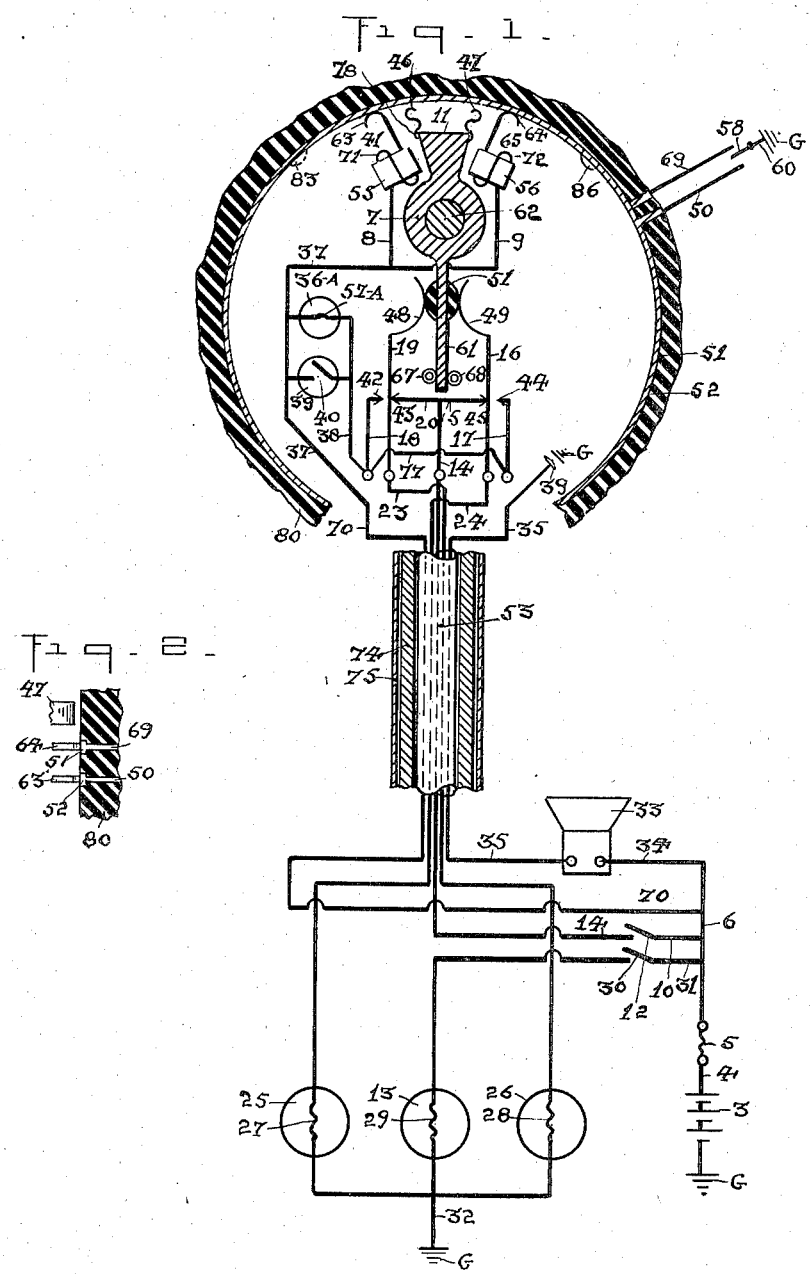

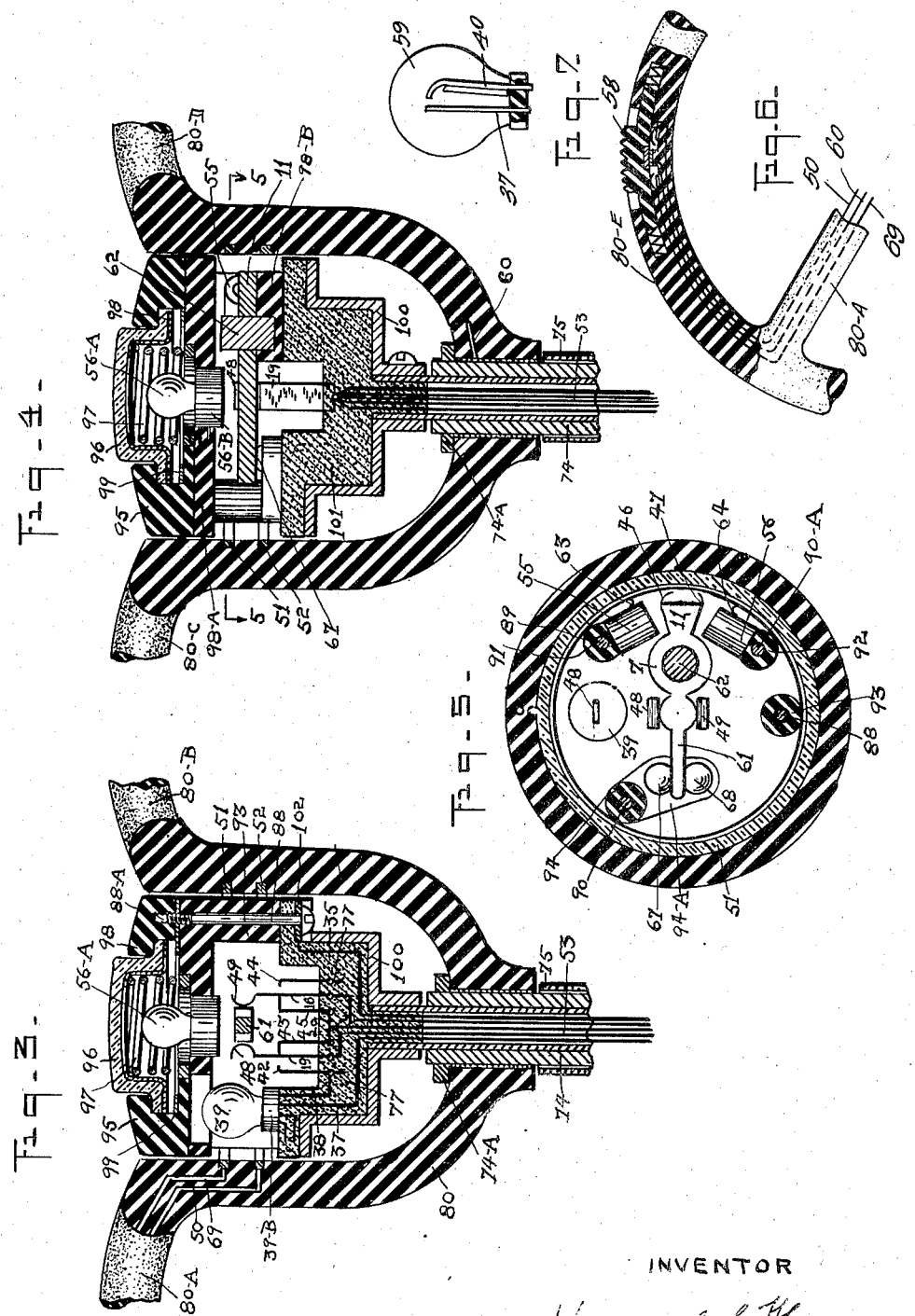

2,206,199

UNITED STATES PATENT OFFICE 2,206,199

SIGNAL SYSTEM FOR VEHICLES

Howard J. Murray, New York, N. Y.

Application December 1, 1936, Serial No. 113,587

10 Claims. (Cl. 177—337)

My invention relates in general to a semi-automatic vehicle signalling system for use wherever such a system can be employed and the invention specifically relates to a signalling system designed for use on an automotive vehicle equipped with a steering wheel and turning and braking means for indicating certain intents and subsequent actions of the operator of the vehicle, as for instance, to decrease the rate of motion of the vehicle, to turn the vehicle to the right or left, and to indicate the end of the turning action.

The primary object of the invention is to provide means for selectively supplying constant and intermittent current to conventional signal units so as to employ the said units collectively and individually to indicate more than one operating intent of the operator, and to also automatically indicate the conclusion of an indicated action.

Another object of my invention is to provide an intermittent or variable intensity signal which may be initiated manually, and which signal will continue automatically after the initiating action has ceased and thereafter until a subsequent manual action occurs.

Still another object of my invention is to provide in connection with right and left blinking signal lights a point of reference by constantly energizing one of a pair of signal units as the other signal unit is intermittently energized as a blinking direction signal. Thus, a constantly energized signal appearing to the right of a blinking left direction signal will indicate the intention of the operator to turn to the left.

An additional object of the invention is to provide in connection with conventional stop lights as usually found on automotive vehicles means remotely selected to control the supply of current to said lights in an intermittent or continuous manner to cause said lights to collectively and individually selectively perform the functions of stop lights, turn signal lights and reference lights.

A still additional object of the present invention is to provide movable with the steering wheel means for controlling current to signal lights on vehicles so that certain of the said signals will be intermittently energized as turn signals for predetermined intervals as the other lights function in the usual manner.

A further object of the present invention is to provide a semi-co-incidental turn signal control means that may be manually set into operative position to thereafter remain undisturbed as a function of the directional operation of the vehicle steering mechanism, and subsequently to be co-incidentally returned to its neutral position as a function of a straightening operation of the said steering mechanism in a direction opposite to that indicated.

Various other objects and advantages of the invention will be in part obvious from an inspection of the accompanying drawings and in part will be more fully set forth in the following particular description of one form of mechanism embodying my invention, and the invention also sets forth certain new and novel features of construction and combination of parts hereinafter set forth and claimed.

The present disclosure is a development of the inventions disclosed in my U. S. Patents No. 1,704,710 issued March 12, 1929, and No. 1,922,493 issued August 15, 1933. The present disclosure is also a development of the invention disclosed in my U. S. application Serial No. 70,224 filed March 23, 1936, and the invention disclosed in my U. S. application Serial No. 104,365 filed October 7, 1936.

In my Patent No. 1,704,710 there is shown a turn signal control switch mounted on the steering wheel to rotate therewith and to be operated by the operator of the vehicle in the act of turning the steering wheel, or in advance of the turning of the steering wheel. In Patent No. 1,922,493 there is disclosed a steering wheel assembly providing means for bringing the leads of a turn signal circuit system up through the steering column and connecting same to a turn signal control means in a manner so that the leads and the control means may be removed together for inspection and service. In application Serial No. 70,224 there is shown means for setting a turn signal control switch to operate a turn signal, and means for automatically returning the control switch to a neutral position when the steering wheel is turned in a direction opposite to that indicated by the turn signal. In application Serial No. 104,365 there is disclosed means for inclosing the automatically returned means of application No. 70,224 within the hub of the steering wheel.

The present disclosure includes means for conducting current from a stationary circuit lead mounted on a stationary column within the rotating steering column to a turn signal control switch mounted on the steering wheel. This current is employed to selectively energize turn signal control magnets and thereby duplicate the manually actuated control switch means of application Serial No. 104,365.

While the remotely selective magnetically actuated and manually reset signal control means of the present disclosure may be used with any form of right and left signals, it will be described in connection with the use of conventional stop and rear signals to selectively introduce circuit elements into the supply leads of the said stop signals to cause same to selectively become turn signals as hereinafter described.

In the drawings:

Figure 1 is largely a diagrammatic representation of the arrangement of means embodying a preferred form of my invention and the circuit connections to complete a circuit organization and the control therefor.

Figure 2 is a vertical section of a portion of the steering wheel hub showing the method of connecting the current supply leads to the source of current supply.

Figure 3 is a sectional view of one embodiment in axial elevation.

Figure 4 is a sectional view in axial elevation taken along a plane 90 degrees to the vertical plane of the axial section of Figure 3.

Figure 5 is a view taken along the line 5—5 of Figure 4 in the direction indicated by the arrows.

Figure 6 indicates a steering wheel in partial sectional elevation and shows the manner of conducting leads to a control switch positioned on the rim of the steering wheel.

Figure 7 indicates a more or less conventional thermo-electric circuit breaker.

In the accompanying drawings there is shown in more or less diagrammatic form a preferred embodiment of my invention with the several mechanical parts shown more or less symbolically together with the necessary electrical parts and connections, but it is understood that the showing is merely suggestive and must be modified to meet the particular requirements of the different makes of vehicles and steering mechanisms upon which it is to be installed and operated.

In the drawing there is shown certain conventional parts now found on vehicles. For instance, there is shown a source of electric energy 3 grounded on one side at G. From the other side of this source current is passed through the conventional circuit breaker or fuse 5 by means of the lead 4 to the common lead 6. There is also shown the usual stop signal lamps 25 and 26 each containing the conventional stop signal filaments 27 and 28. It is assumed that the vehicle is equipped with the usual tail light 13 with the filament 29 and tail light switch 30 and that these lamps are mounted on the rear of the vehicle in the usual manner, as for instance, between two stop lights or a tail adjacent a stop lamp. In addition, it is understood that the leads 81 and 82 lead to other lamps when same are required, and that the lead 66 leads to other tail lights when required.

The control rod 61 and the hub 7 from which it extends may be formed integral with an armature portion 11 normally positioned midway between the two pole-pieces 55 and 56. These pole-pieces are magnetically energized by two similar windings 71 and 72 in sliding electrical contact with the manually actuated turn switch control leads 50 and 69 (see Figure 2) ending in the insulated contact rings 51 and 52 securely positioned in the steering wheel hub portion 80. These contact rings are at all times in electrical contact with the wipers 63 and 64 connected to the magnet windings 71 and 72 by means of the leads 41 and 65. The turn control leads may be moulded in or otherwise secured to turn with the steering wheel and are extended to a manually actuated turn switch lever 58 positioned at some suitable place on the steering wheel which may be convenient to the operator of the vehicle. The lever 58 is suitably grounded to the metal parts of the wheel by means of the lead 60. Thus, control current is available to be manually and selectively directed through either of the magnets 71 or 72 by the manual selective operation of the lever 58 as the steering wheel is moved in either direction or at rest.

The control rod is positioned to rock about the bearing shaft 62 in turn rigidly imbedded in the stationary moulding 98—B. The moulding 98—B is supported in a stationary portion of the steering mechanism as hereinafter described.

In order to distinguish the lamps 25 and 26 from each other at a distance in foggy, rainy weather or in darkness, it is suggested that the said lamps 25 and 26 be positioned on relatively opposite sides, each with an associated tail lamp, or on opposite sides of a tail lamp, considered horizontally of the vehicle in the usual conventional manner.

The present disclosure features the disposing of the turn signal control switch means on the steering wheel within convenient reach of the operator so as to be easily operated manually for causing the conventional stop signal filaments 27 and 28 to function collectively and individually as stop and turn signals, or individually as turn signals through the selective energization of magnets as the said switch is operated. Thus, there is provided a magnetically actuated mechanically released control shown in elevation in Figure 1 and operatively included in the circuit organization. This magnetically actuated direction signal control is provided with a rockable operating rod 61 supported by the shaft 62 in turn positioned and supported in the stationary moulded portion 98—B over which is forced an insulating contact actuator 51 so that it will be securely positioned on the said rod 61. This control means also includes a plurality of flexible spring leaves formed from current conducting material preferably positioned relative to each other by a moulded support composed of insulating material such as Bakelite (not shown).

The leaves 16 and 19 are formed with oppositely disposed curved extending portions 48 and 49 arranged to normally rest against the actuator element 51 when the rod 61 is in the neutral position as shown on Figure 1. The outer leaves 17 and 18 are provided with contact portions 42 and 44 normally spaced away from the leaves 16 and 19 when the rod 61 is in the position shown. The leaves 15 and 20 are provided with contact portions 43 and 45 normally in electrical contact relation with the leaves 19 and 16 as shown in Figure 1. The switch leaves 16, 19, and 42 to 45 inclusive are securely spaced and positioned in the stationary moulded portion (see Figures 3 and 4) 101. The moulded portion 101 is formed so as to be fitted into the stationary hollow rod 53 telescoped within the rotatable steering column 74. The said moulded portion 101 is strengthened by the stationary metal shield 100 formed so as to be fitted over the stationary shaft 53. The insulated moulded portions 94, 91, 93, 92, 98—A and 98— are integral and together form one moulded member. A top cover moulding portion 95 is formed with an opening sufficient to receive the transparent horn button 96 held resiliently in non-operating position by the current conducting spring 97 in a conventional manner so as to close the horn circuit contacts 98 and 99 when depressed. The moulded portions 101, 98— and associated portions and also moulding 98 are secured together by means of the screws 88, 89, 90, and 90—A.

A pair of give-away stop elements 67 and 68 are positioned stationary relative to the rod 61 so as to be in the path of the said extension as it rocks to the right and left when moved by the magnets 55 and 56 or the spring leaves 16 and 19. Thus, when the armature portion 11 is moved about the shaft 62 to the left the rod 61 will be moved to the right to force back the give-away stop element 68 to ride over and by the same. When the operator's hand is removed from the lever 58 the spring leaf 16 actuated to the right and thus under tension will tend to restore the rod 61 to its neutral position because the magnet 55 will be de-energized. But the stop element 68 is provided with greater resistance than the leaf 16 and thus the leaf 16 will not be able to overcome the stop element 68, and the rod 61 will be prevented from returning to its neutral position. The same operation takes place with the give-away stop 67 when the rod 61 is moved from neutral to the left.

A conventional electro-thermostatic circuit element 40 is provided preferably in a dust-proof gas-proof container 39 formed to be secured to the base 39—B in turn secured to the stationary moulding 101, and a pilot or front signal lamp 36A including the filament 57—A is secured to the stationary base 65—B securely fixed in the moulding portion 98—A is connected to the terminals of the element 40 by means of the leads 37 and 38. Two one-way curved members 46 and 47 are positioned and attached to the armature 11 by means of the rivets 78 so as to normally lie flat against the faces of the armature.

The neutralizing ears 46 and 47 are preferably made of spring steel so that they may be provided more or less resilient. As the axis of the shaft 62 is outside of the axis of the hub portion 80, it is obvious that the said ears may be positioned on the armature portion 11 so as to be normally free of actuating contact with the hub 80 of the steering wheel when the lever 61 is in the neutral position shown in Figure 1, and that the said ears may be selectively moved or rotated into position to be in operative relation with the hub 80 when the armature portion 11 is rotated with the hub portion 7 about the shaft 62 in either direction from a neutral position as the armature portion 11 is actuated by the pull of the pole-pieces 55 or 56. Thus none of the elements shown by Figures 1, 3 and 4 within the hub of the steering wheel rotate with the said steering wheel except the nut 74—A and the steering column 74. Thus the manual operation of the turn switch lever 58 to close the circuits of either leads 58 and 69 will energize either of the windings 71 and 72 and the associated pole-pieces 55 and 56 to pull the armature 11 to actuate the lever 61 and to also move either of the ears 46 and 47 into frictional contact with the hub portion 80 of the steering wheel.

The leaves 17 and 18 are connected together and to the supply lead 6 by means of the leads 38 and 70 and the circuit element 40. The leaves 15 and 20 are connected to the common lead 14 and to the lead 6 by means of leads 10 and 14 and the normally open brake operated switch 12. The filament 27 is connected to the leaf 16 by means of the lead 24, and the filament 28 is connected to the leaf 19 by means of the lead 23.

In operation, it will be understood that the conventional stop signal filaments 27 and 28 will be constantly energized to normally function as stop signals upon the co-incidental operation of the normally open brake operated switch 12. When it is desired by the operator of the vehicle to selectively employ the stop filaments 27 and 28 as turn signals the operator will move the switch lever 58 to rock the lever to the right or left to operate the system to intermittently energize either of the filaments 27 and 28 as an indication of his intention to subsequently turn the vehicle to the right or to the left.

Now let it be assumed that the operator of the vehicle upon which the present device is installed is approaching a left turn and intends to make the said left turn. In this event, the operator will move the turn switch lever 58 to the left to contact with the lead 69 connected to the ring 51 (see Figure 2). Thus, current will be caused to flow from the battery 3 through leads 70, 37 and 8, and winding 71, lead 41, wiper 63, lead 69, lever 58, lead 60 to ground. Thus the pole-piece 55 will be energized to pull the armature to the left and the rod 61 to the right and over the stop element 68. At the same time the leaf 16 will be moved to the right to contact with the leaf 17 and to move out of contact with the leaf 15. Thus the leaf 17 will now be in electrical circuit relation with the contact 44 and out of electrical relation with the contact 45. At the same time the ear 47 will be moved into frictional relation with the hub portion 80 of the steering wheel. It is assumed that the vehicle is still moving forward along an approximately straight path, the steering wheel more or less stationary.

As long as the control switch 58 of Figure 1 is in the neutral position as shown, the closing of the normally open brake operated switch 12 will cause current to flow through the conductor 14 to leaves 15 and 20, thence to leaves 16 and 19, and thence by means of conductors 23 and 24 to the stop signal filaments 27 and 28 to constantly energize said filaments as conventional stop signals. As long as the manually actuated control switch handle 58 is in its neutral biased position as shown by Figure 1 the lamps 25 and 26 will continue to be constantly energized as stop signals as long as the brake operated switch 12 remains in a closed circuit position.

When the control rod 61 is operated about the shaft 62 to move the extension to the right as hereinbefore described, the leaves 16 and 17 will be moved into electrical relation. At the same time the leaves 15 and 16 will be moved out of electrical contact relation, and the filaments 27 will be no longer constantly energized as the brake operated switch 12 remains closed. However, the filament 28 will remain constantly energized as a stop signal as long as the switch 12 is closed, and the filament 28 will not be affected in its operation as a stop signal as the handle 58 is moved to the left.

The leaf 17 is connected to the battery lead 6 by conductor 38 thus permitting current to pass through the electro-thermostatic current interrupter 40. Thus, when the leaves 16 and 17 are moved into electrical contact by the movement of the rod 61 to the right, the conventional current interrupter 40 will begin to function in a manner known and accepted in the art and intermittent current will now be passed through the filament 27 to intermittently energize the lamp 25 as a left direction signal as the other stop filament 28 (with switch 12 still closed) continues to be constantly energized as a conventional stop signal, and also as a reference light to the flashing filament 27. In periods of low visibility the conventional tail lights 29 would be energized, and under normal conditions these tail lights will also act as reference lights to either filament 27 or 28 when intermittently energized as direction signals, especially when arranged in the manner hereinbefore described.

Every time the current interrupter element 40 is closed, the pilot filament 57—A will in effect be short-circuited and the said filament 57—A will be de-energized. When the said circuit interrupter 40 is open the filament 57—A will be in circuit in series with the filament 27 (or 28), and the same current that flows through the filament 27 (or 28) will also flow through the filament 57—A. Filament 57—A may be used as a pilot light, or may be placed in the front of the vehicle to become intermittently energized in an alternate manner with either of the filaments 27 and 28. In actual operation the filament 57—A will normally be of a much smaller current carrying capacity than the filaments 27 and 28, and may be selected so that the intensity of the filament 57—A will be much more intense than the filaments 27 and 28 as the same current is passed through them.

Thus the filament 57—A will not be energized as the filaments 27 and 28 are constantly energized, but will be intermittently energized in an alternate manner with the filaments 27 and 28 when they are selectively energized in an intermittent manner as turn signals. If the filament 57—A is removed the electrical status of the remainder of the system will not be operatively affected, as when the thermo-stat 40 is closed the filament 57—A is sort circuited and not illuminated, and when the thermostat 40 is open the filaments 27 and 28 are not illuminated and unaffected by the illuminated status of the filament 57—A. Of course, removal of the filament 57—A will result in no current passing through the filaments 27 and 28 instead of a small amount passed under normal conditions, when the thermostat 40 is open, but this results in no visible change in the status of the filaments 27 and 28. Filament 57—A may be used alone as a pilot lamp to indicate to the operator that either of the filaments 27 or 28 is burned out, as it is obvious that the filament 57—A cannot be energized if either of the filaments 27 or 28 is open.

When the control handle 58 is moved to the left the extension portion 61 is forced against the give-away stop element 68 to overcome same and thus permit the operator to magnetically move the portion 61 past the said stop. When the operator's hand is removed from the handle 58 the said give-away stop element 68 will now act to prevent the compressed leaf spring 16 from returning the rod 61 to its normal neutral position. In this event the leaves 16 and 17 will continue in electrical contact relation and thus the filament 27 will continue to be intermittently energized after the operator's hand is removed, and the lever 58 returned to neutral and the filament 28 will continue to be constantly energized as a stop signal if the brake operated switch 12 is closed. Also the filament 57—A will continue to alternately blink with the filament 27.

As the extension portion the rod 61 is moved to the right the portion 11 will also be rotated counter-clockwise about the supporting shaft 62 to move the attached flexible members 46 and 47 counter-clockwise.

The hub 80 is attached to the turn mechanism of the vehicle as hereinbefore stated. The hub 80 for the purpose of this disclosure is assumed to be attached to the steering wheel. Thus, when the spring elements 46 and 47 are rotated they are moved into the path of the hub 80. When the spring element 47 is moved counter-clockwise into contact with the hub 80 by the movement of the member 11 to the left there will be no movement between the hub 80 and the element 47 as long as the operator of the vehicle continues to operate the said vehicle more or less along a straight path. With the rod 61 set by the stop element 68 as hereinbefore described the filament 27 will be intermittently energized as a left turn signal as the switch 12 is opened and closed to constantly energize the filament 28 at intervals as a stop signal. With the rod 61 set for a left direction signal, no further mental or physical effort is required on the part of the operator, and he is free to use both eyes and hands in the normal operation of the vehicle as he approaches his intended left turn.

When the operator reaches the point of turning to the left, he may pause because of traffic conditions, and even though he had turned the steering wheel preparatory to turning to the left there will be no interference with the intermittent energization of the filament 27 as a blinking left turn signal. This is true, because no matter how much the steering wheel is turned counter-clockwise (turning to the left) the hub 80 will also be rotated counter-clockwise and will move against the spring element 47 to tend to cause the said element 47 to move. This action would only cause a slight pressure against the armature 11 to move it counter-clockwise and thus cause the rod 61 to be operated still further to the right thus compressing the spring leaf 16 to a slight extent. Thus the operator may turn the steering wheel to any operative extent without interfering with the intermittent energization of the filament 27 as a blinking left turn signal as he waits in traffic for an opportunity to make his intended turn. The face of the pole-pieces 55 and 56 will ordinarily act as a stop for the member 7.

Eventually this opportunity will come, and the turn will be made with the filament 27 blinking as a left turn signal without any attention on the part of the operator, and with the filament 28 constantly energized (if the switch 12 is closed) at intervals as a stop signal.

Thus, when making a turn the steering wheel may be rotated so that it makes one or more revolutions without disturbing the status of the control rod 61. When making the said left turn, the wheel is turned somewhat at the intersection or point of turning and then an additional turning movement may be added as the turn is completed. As long as the wheel is turned counter-clockwise the filament 27 will continue to receive intermittent current.

When the turn to the left has been completed a direction signal is no longer needed for protection, and in addition the operator now turns the wheel clockwise to straighten out the vehicle to the new direction of travel. The hub 80 will also now be rotated clockwise, and the first clockwise movement of 80 against the spring element 47 will press against the armature 11, and thus pressure will be transmitted from the hub 80 to the member 7, the rod portion 61, to move same to the left. As the portion 11 is rigidly attached to the member 7 the extension 61 will be actuated to overcome to give-away stop element 68, because the force of the hub turning means will be greater than the said resistance of the element 68. In this event, the extension 61 will be forced by the said stop element 68 and the tension of the leaf spring 16 will restore the control rod 61 to its normal neutral position as shown in Figure 1.

As magnetically actuated control settles to its normal neutral position the switch leaf 16 will move out of its electrical relation with the contact 44 of the leaf 17 and into electrical relation with the leaf 15 and its contact 45. Thus, interrupted current from the element 40 will be cut off from the filament 27 and current from the brake operated switch 12 may be passed to the filament 27 when the switch 12 is closed to again constantly energize it as a stop signal.

If the operator now wishes to indicate and make a right turn, he will move the handle 58 to the right to move the extension 61 to the left past the give-away stop 67, and also to move the switch leaf 19 out of electrical relation with the contact 43 of leaf 20 and into electrical relation with the contact 42 of the leaf 18 to supply intermittent current to the filament 28 to cause same to blink as a right turn signal, and the filament 57—A will alternately blink with the said filament 28.

All of the operations hereinbefore described for a left turning operation will apply to the operations for a right turn operation. Similar elements will be used, and it is not believed necessary to repeat same to those skilled in the art.

The present disclosure also contemplates the use of the means disclosed as a safety system. If the operator indicates his intention of turning to the left, and then turns to the right, it will be noted that the spring element 47 will be moved out of the path of the hub 80, because a right turn can only be made by turning the steering wheel clockwise, and with the armature 11 set for a left turn the rod 61 will be moved to neutral and reset with a clockwise turn of the wheel. It should be noted then, that in the event the operator indicates one direction, and turns in another direction, the indicated direction will be automatically stopped at the start of the turn in the opposite direction.

In conclusion, assume the vehicle to be in motion. The operator has closed the brake operated switch 12 and both filaments 27 and 28 are constantly energized as conventional stop signals. Now the operator intends to turn to the right and accordingly moves the control handle 58 to the right with the result that the filament 28 blinks as a right turn signal as the filament 27 continues to be constantly energized as a stop signal. If the brake switch 12 is now opened the filament 27 will be de-energized and the filament 28 will continue to blink as a right turn signal. If this event occurs at night, switch 30 will be closed and the tail light 13 on the opposite side of the rear of the vehicle will serve as a reference light. In any event the operation of the brake operated switch 12 will have no effect on the intermittent energization of the filament 28 as long as the rod 61 is moved to the right. Now the operator removed his hand from the handle 58 and the filament 28 continues to blink as a turn signal. Subsequently he makes the right turn as the filament 28 continues to blink. As long as the right turn is being made the filament 28 will continue to blink, but when the operator starts to straighten out the vehicle to its new direction of travel opposite to that indicated the filament 28 will stop blinking, and the signal system will be returned to its normal neutral stop signal status as a co-incidental function of the directional operation of the steering mechanism.

While I have shown and described, and have pointed out in the annexed claims, certain novel features of my invention, it will be understood that various omissions, substitutions and changes in the form and details of the device illustrated and in its operation may be made by those skilled in the art without departing from the spirit of my invention.

It is obvious that any mechanical equivalent of the means for neutralizing the control rod 61 and thus the closers may be employed and placed at any point of the movable steering system so that the control of the circuit controlling leaves 15 and 20 may be magnetically effected to initiate the intermittent energization of one of the stop filaments 27 and 28, and manually effected to terminate the said intermittent energization and return both filaments to a stop signal circuit status. For example, the ears 46 and 47 may be formed so as not to be moved into contact with the moving surface of the movable hub 80, but merely into the path of the projections 83 and 86 attached to and forming a portion of the hub 80. This method of neutralizing the turn control is more clearly shown in the disclosure of my co-pending application, Serial No. 70,224 filed March 23, 1936.

If more than one set of signal lamps as 25 and 26 are required these additional lamps (not shown) may be synchronously controlled with the filaments 27 and 28 by connecting same to the leads 81 and 82.

As one rear lamp is employed on some vehicles and more than one rear lamp on other vehicles, these additional lamps may be synchronously lighted with the tail lamp 29 when the switch 30 is closed by connecting same to the lead 66.

Having thus described my invention, I claim:

1. In a signal circuit organization for vehicles equipped with steering wheel and including a normally open brake pedal operated switch and a magnetically actuated circuit closer settable from a neutral position to two operative positions, a source of current, a pair of signal lamps mounted on the rear of the vehicle and on opposite sides of same, means, including the said circuit closer, responsive to the closing of said brake pedal operated switch to constantly energize both signal lamps, a manually operable turn signal control switch mounted on the said steering wheel for selectively energizing the said circuit closer, means responsive to the setting of the magnetically actuated closer for intermittently energizing one of the signal lamps, and means responsive to the manual turning of the steering wheel in a direction opposite to that indicated by the intermittent signal lamp for returning the said circuit closer to its said neutral position.

2. In a signalling system forming a portion of a turnable vehicle provided with a rear light, a pair of lamps each including a stop signal filament mounted at the rear of the vehicle and on opposite sides of same with reference to the rear light, a normally open brake pedal operated switch, a second magnetically actuated switch including two separately actuated circuit closers each having a neutral position, means responsive to the closing of said first switch when said closers are both in neutral position to constantly energize both filaments as stop signals, a manually actuated turn signal switch mounted on the steering wheel of the vehicle to move therewith and to selectively supply current to the said magnetically actuating means, and further means responsive to the magnetic closing of one of the said closers in a settable position to intermittently energize one of the said stop filaments as a turn signal, and means responsive as a function of the straightening out of the vehicle subsequent to a signalled turn for returning the said set closer to a neutral position.

3. In a direction signalling system for vehicles equipped with a steering wheel, a current source, a pair of signal lights mounted at the rear of the vehicle on opposite sides of same, a normally open brake pedal operated switch, a turn signal control member including two magnetically operated portions and two circuit effecting elements each having a neutral position and a settable position, manually actuated switch mounted on the said steering wheel to move therewith and arranged to selectively energize the magnetically operated portions of the control member, means responsive to the closing of the first mentioned switch when both said circuit closing elements are in said neutral position to constantly energize both signal lights, and further means including an electrically actuated current interrupter responsive to the magnetic closing of either of the said elements in a settable position to intermittently energize one of the said lights, a closer resetting member, said resetting member positioned relative to a moving portion of the steering wheel to be moved by same to release the said set closer as a function of the turning of the said vehicle in a direction opposite to the indicated turn signal and thus permit the said closer to return to its neutral position.

4. In a vehicle signalling system, a source of current, a pair of signal lights mounted on the rear of the vehicle and on opposite sides of same, a normally open brake pedal operated switch, a second magnetically actuated turn signal switch including two separately actuated circuit closers each having a neutral position and a selectively settable position, means for selectively controlling the magnetic actuation of the said circuit closers, means responsive to the closing of the first mentioned switch when both of the said closers are in neutral position to constantly energize the said signal lights, and further means responsive to the magnetic setting of one of the said closers to intermittently energize one of the signal lights as the means responsive to the closing of the first mentioned switch continues to constantly energize the other signal light.

5. In a signalling system for vehicles provided with a steering wheel, a current source, a pair of lights mounted at the rear of the vehicle and on opposite sides of same, a normally open brake pedal operated switch, a second switch including a common magnetically actuated portion and two selectively operative circuit closers each having a neutral position and a settable position, manually operative means for controlling the magnetic operation of the said common portion, means responsive to the closing of the first mentioned switch when both closers of the said second switch are in said neutral position to constantly energize both lights, further means, including a current interrupter, for intermittently energizing one of the lights as a turn signal without affecting the constant energization of the other light by the first mentioned means, means also magnetically actuated with the said common means to thereby be placed in the path of a portion of the said steering wheel, said means returned to an inoperative position as the vehicle is turned in a direction opposite to that indicated by the intermittent signal and therewith to cause the return of the said set closer to its neutral position.

6. In a signalling system for turnable vehicles equipped with a steering wheel, a current source, a pair of stop signal lights mounted at the rear of the vehicle and on opposite sides of same, a normally open brake pedal operated switch, a second switch including a magnetically actuated portion having a neutral position and two selectively settable positions, electro-responsive means for actuating the said portion, means responsive to the closing of the first mentioned switch when said portion is in neutral position to constantly energize both stop lights, manually actuated means for selectively controlling the energization of the electro-responsive means, and further means responsive to the setting of the said portion to intermittently energize one of the said stop lights.

7. In a direction signalling system for vehicles equipped with a steering wheel, a pair of signal lights mounted on opposite sides at the rear of the vehicle, a first switch, a second switch including a magnetically responsive portion having a neutral position and two settable positions, a pair of magnets for selectively actuating the said portion, a manually movable switch mounted on the steering wheel for energizing the said magnets, means responsive to the closing of the first switch when the said portion of the second switch is in its neutral position to constantly energize both signal lights, further means including a current interrupter responsive to the actuation of the said portion to a settable position to intermittently energize one of the signal lights, and still further means associated with the said magnets to be operated as a function of the operation of the said portion to a settable position to become responsive to the operation of the steering wheel when rotated in a direction opposite to that indicated by the intermittently energized signal light to act to return the said portion to its neutral position.

8. In a device of the class described including a circuit control having a magnetically responsive portion selectively settable in two operative positions, means responsive to the setting of said portion for causing vehicle stop lights mounted on opposite sides of the said vehicle and visible from the rear thereof to selectively blink as turn signal lights prior to and during a turning movement of a vehicle equipped with a steering wheel, and means actuated into frictional contact with said steering wheel during the magnetic setting action for acting during a subsequent straightening of the vehicle to release the said settable portion.

9. In a signalling system for vehicles equipped with a steering wheel and a brake pedal operated switch, a tail light, a pair of stop signals mounted on opposite sides of said tail light, and a source of power, manually actuated means for initiating a signal of the operation of the brake pedal of the said vehicle, a manually actuated switch movable with the steering wheel, magnetically actuated means energized by the movable switch, means responsive to the energization of the said magnetically actuated means for intermittently affecting one of the stop signals for signalling with the tail light the intention of making a vehicle turn, means for continuing the turn signal as the said turn is being made, and resetting means actuated by the steering wheel when moving in a direction opposite to the direction indicated for causing the turn signal to cease and the magnetically actuated means to return to its former status.

10. In a circuit control, the combination of a vehicle steering wheel having a hollow hub and a manually operable switch on the steering wheel with a magnetically actuated switch mechanism mounted within the said hub, said mechanism having a portion thereof frictionally engaging said hub, whereby said portion will act to return the said mechanism to an inoperative status when the said wheel is moved in one direction following its movement in the opposite direction.

HOWARD J. MURRAY.